(12) United States Patent
Adachi et al.

(10) Patent No.: US 7,382,442 B2
(45) Date of Patent: Jun. 3, 2008

(54) OBJECT DETECTOR OF VEHICLE

(75) Inventors: Yoshiki Adachi, Okazaki (JP); Takekazu Terui, Kariya (JP)

(73) Assignee: Denso Corporation, Kariya (JP)

( * ) Notice: Subject to any disclaimer, the term of this patent is extended or adjusted under 35 U.S.C. 154(b) by 535 days.

(21) Appl. No.: 11/093,841

(22) Filed: Mar. 30, 2005

(65) Prior Publication Data

US 2005/0219504 A1    Oct. 6, 2005

(30) Foreign Application Priority Data

Mar. 31, 2004   (JP)   ............................. 2004-104119

(51) Int. Cl.
G01C 3/08   (2006.01)
(52) U.S. Cl. .................................. 356/4.01
(58) Field of Classification Search ...... 356/3.01–3.15, 356/4.01–4.1, 5.01–5.15, 6–22, 28, 28.5, 356/139.01–139.1
See application file for complete search history.

(56) References Cited

U.S. PATENT DOCUMENTS 5,896,190 A * 4/1999 Wangler et al. ............ 356/4.01
6,317,202 B1   11/2001 Hosokawa et al.

FOREIGN PATENT DOCUMENTS

JP    10-82934      3/1998
JP    2002-031685   1/2002

* cited by examiner

*Primary Examiner*—Thomas H. Tarcza
*Assistant Examiner*—Luke D Ratcliffe
(74) *Attorney, Agent, or Firm*—Harness, Dickey & Pierce, PLC

(57) ABSTRACT

A polygon mirror of an object detector of a vehicle includes first faces for projecting a laser to a first predetermined area and a second face for projecting the laser to a second predetermined area higher than the first predetermined area. The polygon mirror is rotated to project the laser to the first and second predetermined areas through a projection window. Thus, the laser can be projected not only to an area at normal height in front of the vehicle but also to an area higher than the normal height in front of the vehicle. Thus, even if a reflection object of an obstacle is positioned at a high position, probe light can be projected to the reflection object. As a result, object detection or distance measurement can be performed correctly.

11 Claims, 4 Drawing Sheets

US 7,382,442 B2

OBJECT DETECTOR OF VEHICLE

CROSS REFERENCE TO RELATED APPLICATION

This application is based on and incorporates herein by reference Japanese Patent Application No. 2004-104119 filed on Mar. 31, 2004.

BACKGROUND OF THE INVENTION

1. Field of the Invention

The present invention relates to an object detector mounted on a vehicle for detecting an object such as a preceding vehicle with the use of light waves.

2. Description of Related Art

As a kind of object detector mounted on a vehicle, there is a known distance measurement device (a laser radar) for measuring a distance from an obstacle such as a preceding vehicle (a vehicle in front) with the use of a laser and the like, for instance, as disclosed in JP-A-2002-031685 (Patent Document 1). The distance measurement device makes a laser diode intermittently emit the light ahead of the vehicle. The distance measurement device senses light reflected by the obstacle in front of the vehicle with the use of a photo sensor. The distance measurement device measures the distance from the obstacle based on a time difference between light emitting timing and light receiving timing.

More specifically, the distance measurement device has a light emitter, a polygon mirror, and a light receiver. The light emitter emits a laser. The polygon mirror is formed in the shape of a truncated six-sided pyramid. The polygon mirror rotates and functions as a scan mirror. The polygon mirror reflects the laser. The light receiver receives the reflected laser. Thus, the laser emitted by the light emitter is reflected and led ahead of the vehicle by the polygon mirror. At that time, the polygon mirror is rotated so that the laser from the emitter strikes the respective side faces of the polygon mirror. Angles, at which the polygon mirror reflects the laser, are adjusted to scan a predetermined area in front of the vehicle with the laser. A reflector of the preceding vehicle is used as a reflection object in the obstacle. The light receiver receives the laser reflected by the reflector to measure the distance.

In the conventional distance measurement device, the laser projected toward the preceding vehicle scans an area (referred to as a first predetermined area, hereafter) of an angle of approximately 4 degrees in a vertical direction and an angle of approximately 36 degrees in a horizontal direction. In the case where the first predetermined area is applied to a vehicle such as a truck, which is large in vehicle height and has a reflector at a high position, the mounting position of the reflector is higher than the area to which the laser is projected. In such a case, there is a possibility that the laser cannot strike the reflector suitably and distance measurement cannot be performed correctly.

SUMMARY OF THE INVENTION

It is therefore an object of the present invention to provide an object detector capable of projecting probe light to a reflection object of an obstacle even if the reflection object is positioned at a high position, for instance, in the case where the obstacle is a vehicle having large vehicle height. Thus, object detection or distance measurement can be performed correctly.

According to an aspect of the present invention, an object detector includes a case, a light emitter, a rotary body, a projection window, and a light receiver. The light emitter is disposed in the case for emitting probe light. The rotary body is disposed in the case and includes reflection faces. The rotary body reflects the probe light at the reflection faces to scan a predetermined area with the use of the probe light. The projection window is formed by a translucent material for allowing passage of the probe light reflected by the rotary body. The light receiver is disposed in the case for receiving the reflected probe light. The object detector projects the probe light to an outside of the case through the projection window by reflecting the probe laser, which is emitted from the light emitter, at the rotary body and receives the probe light, which is reflected by an object outside the case, with the light receiver. Thus, the object detector detects an object. The reflection faces include a first face for projecting the probe light to a first predetermined area through the projection window and a second face for projecting the probe light to a second predetermined area higher than the first predetermined area through the projection window. The rotary body rotates to project the probe light to the first predetermined area and the second predetermined area through the projection window.

Thus, the rotary body of the object detector includes the first face for projecting the probe light to the first predetermined area and the second face for projecting the probe light to the second predetermined area. By rotating the rotary body, the probe light can be projected to the first predetermined area and the second predetermined area through the projection window. The object detector can project the probe light to a position at a normal height in front of the vehicle. In addition, the object detector can project the probe light to the upper position higher than the normal height in front of the vehicle. As a result, even if a reflection object of an obstacle is positioned at a high position, for instance, in the case of a vehicle having large vehicle height, the probe light can be projected to the reflection object, and the object detection can be performed correctly.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS

First Embodiment

Figure 1:
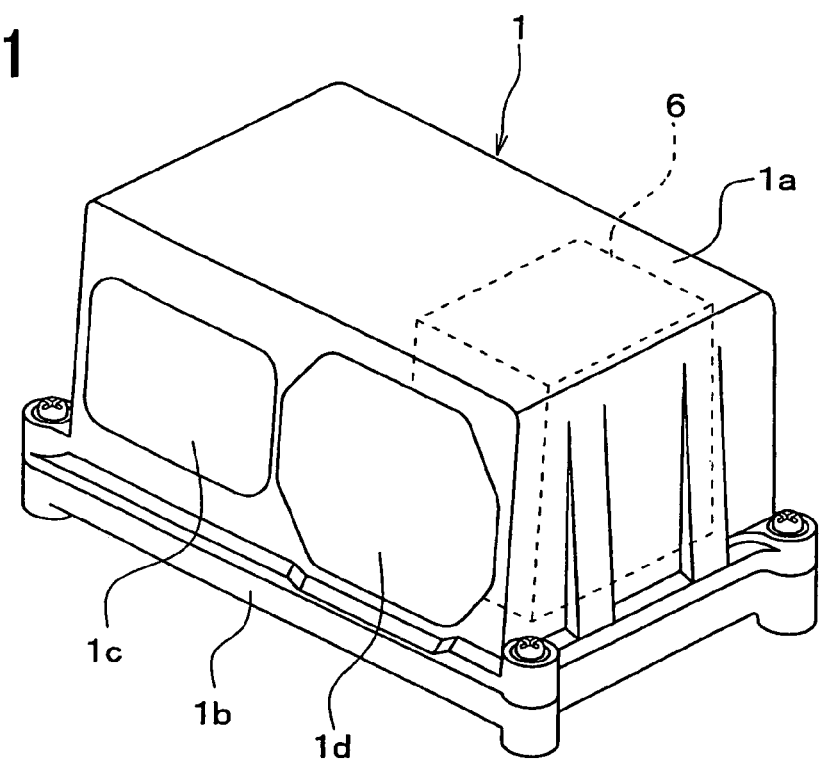
FIG. 1 is a perspective view showing an object detector according to a first embodiment of the present invention.

Referring to FIG. 1, an object detector according to a first embodiment of the present invention is illustrated.

Figure 2:
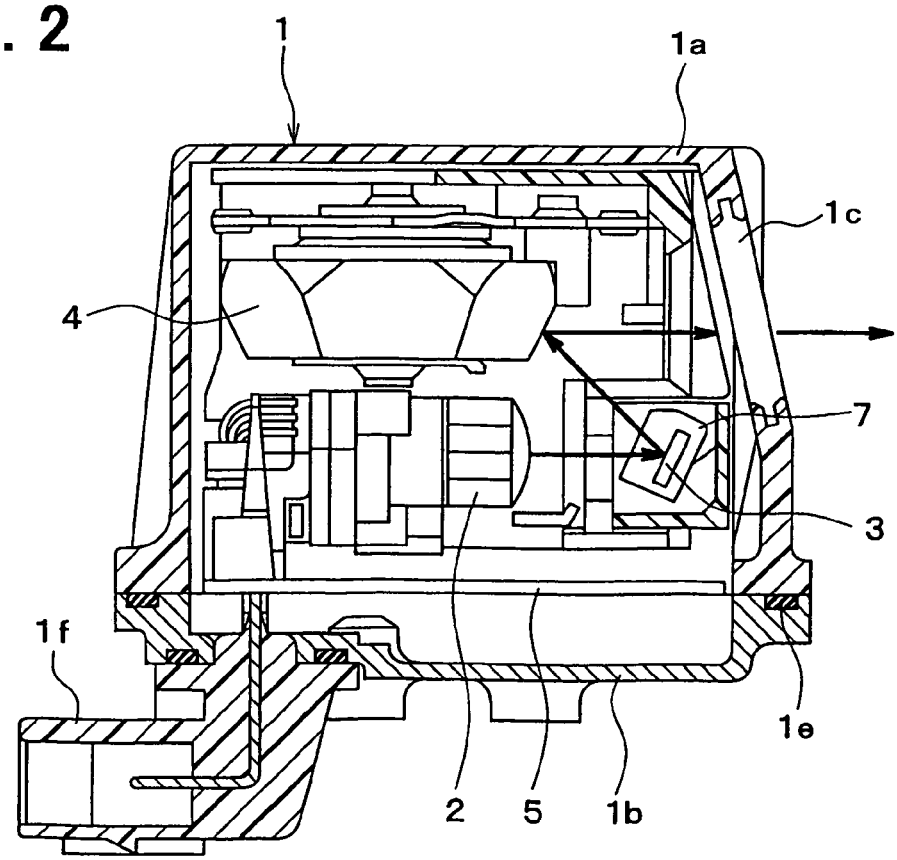
FIG. 2 is a sectional view showing the object detector according to the first embodiment.

The object detector shown in FIG. 1 is mounted in a vehicle. The object detector is positioned so that a right side of the object detector in FIG. 2 is directed ahead of the vehicle, for instance. The object detector of the present embodiment is used as a laser radar for detecting an obstacle such as a preceding vehicle (a vehicle in front) or for measuring a distance between the obstacle and the own vehicle during automatic cruise control (adaptive cruise control), for instance.

Figure 3:
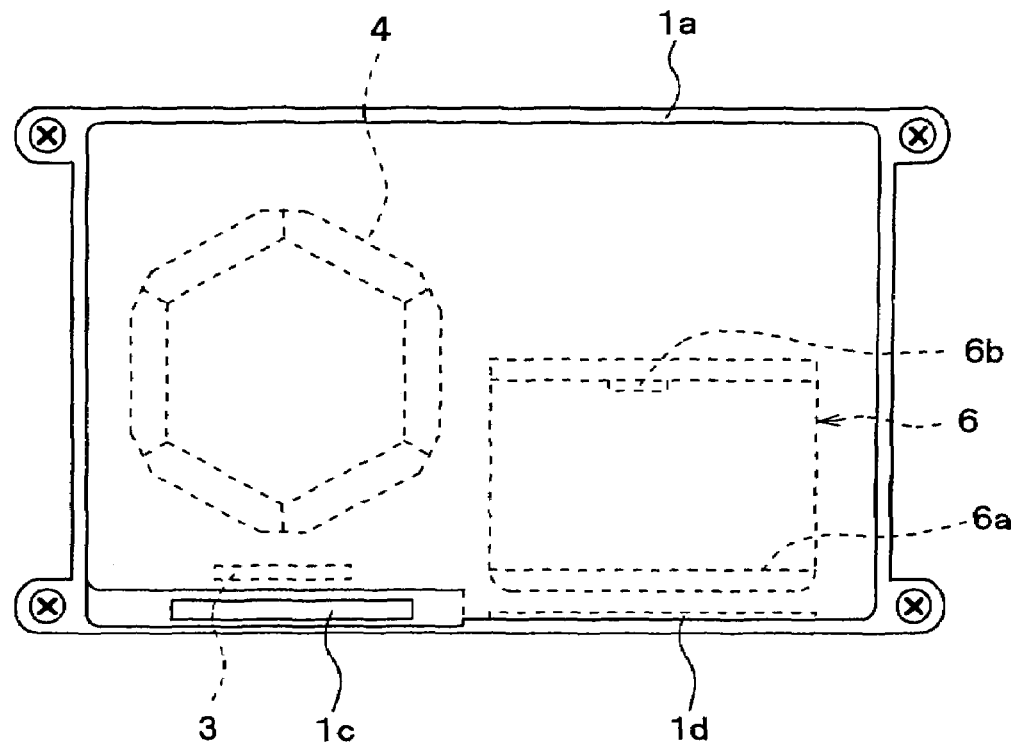
FIG. 3 is a view showing an upper face of the object detector according to the first embodiment.

Various parts of the object detector are accommodated in a resin case 1 substantially in the shape of a cube as shown in FIGS. 1 to 3.

The case 1 is formed by a first case portion 1a and a second case portion 1b. The first case portion 1a is formed in the shape of a box formed with an opening in one face thereof. The various parts are accommodated in an accommodation space provided by the first case portion 1a. The first case portion 1a is basically formed by a homogenous resin material. A projection window 1c and an entrance window 1d, which are formed by a translucent material such as glass or a acryl resin, are arranged side by side in a face of the first case portion 1a directed ahead of the vehicle.

The second case portion 1b is formed by a resin, for instance. The second case portion 1b is fitted to the opening of the first case portion 1a through a sealing member 1e.

As shown in FIG. 2, a connector if is provided on a part of the second case portion 1b so that the connector 1f partially protrudes from the case 1. Electrical connection between an inside and outside of the case 1 can be achieved through the connector 1f.

A light emitter 2, a reflection mirror 3 and a polygon mirror 4 are disposed in a lower position in the case 1 in FIG. 2. A circuit board 5 equipped with a control portion for controlling the object detector and the like is also disposed in the lower portion of the case 1. A light receiver 6 is also disposed in the case 1 so that the light receiver 6 faces the entrance window 1d.

The light emitter 2 is operated based on a drive signal outputted from the control portion of the circuit board 5 to emit a laser toward the reflection mirror 3. For instance, the light emitter 2 is formed by a laser diode and generates the laser (probe light) as a pulse-shaped probe electromagnetic wave.

The reflection mirror 3 reflects the laser emitted by the light emitter 2 and projects the laser toward the polygon mirror 4. The reflection mirror 3 is held by a holding portion 7, which is fixed to an inner wall of the case 1, to the case 1 so that the reflection mirror 3 can swing. A motor driven by the control portion of the circuit board 5 swings the reflection mirror 3 to perform fine adjustment (adjustment in approximately one degree, for instance) of a reflection angle around an axis perpendicular to the face of FIG. 2.

The polygon mirror 4 is formed in the shape of a truncated six-sided pyramid, or a six-sided pyramid of which a top is cut off. The polygon mirror 4 is held on a lower face of the first case portion 1a so that the polygon mirror 4 can rotate around an axis of the six-sided pyramid above the circuit board 5. A motor controlled by the control portion of the circuit board 5 drives the polygon mirror 4 to rotate. All of side faces of the polygon mirror 4 function as reflection mirrors. Thus, the polygon mirror 4 functions as a scan mirror.

More specifically, if the reflection mirror 3 reflects the laser emitted by the light emitter 2, the polygon mirror 4 reflects the laser again. Thus, the polygon mirror 4 leads the laser ahead of the vehicle through the projection window 1c of the first case portion 1a. If the motor drives the polygon mirror 4 to rotate, an angle of the side face of the polygon mirror 4 reflecting the laser changes in accordance with the rotation. Accordingly, a projection angle of the reflected laser changes. Thus, a predetermined area in front of the vehicle is scanned.

Figure 8:
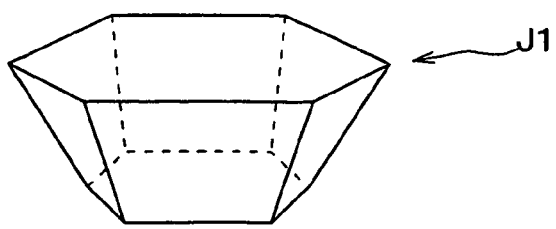
FIG. 8 is a perspective view showing a polygon mirror of an object detector of a related art.

As shown in FIG. 8, a polygon mirror J1 of a related art is formed in the shape of a truncated six-sided pyramid, or a six-sided pyramid of which a top is cut off. More specifically, angles of the respective side faces of the polygon mirror J1 of the related art are differentiated by minute angles to obtain a necessary scanning range in a vertical direction. For instance, in the case where an angle of an arbitral face of the polygon mirror J1 with respect to a bottom surface (an upper surface in FIG. 8) of the truncated six-sided pyramid is θ1 degree, an angle of another face next to the arbitral face is set at θ1-Δ1 degree, and an angle of yet another face next to the another face is set at θ1-2Δ1 degree. Thus, the angles of the six faces with respect to the bottom surface are set at θ1 degree, θ1-Δ1 degree, θ1-2Δ1 degree, θ1-3Δ1 degree, θ1-4Δ1 degree and θ1-5Δ1 degree on the basis of the arbitral face.

Figure 4:
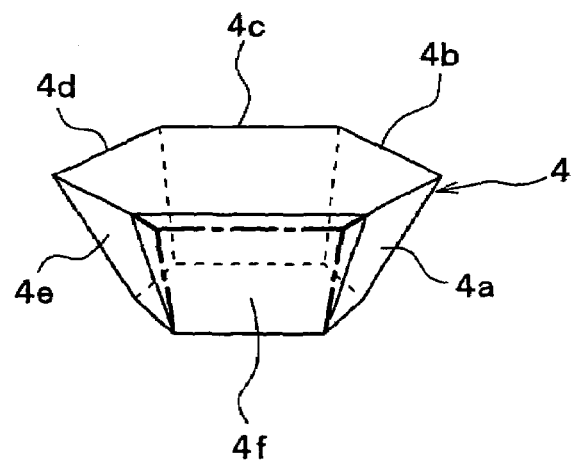
FIG. 4 is a perspective view showing a polygon mirror of the object detector according to the first embodiment.

In contrast, the polygon mirror 4 of the present embodiment is formed in the shape of a truncated six-sided pyramid, of which one side face is chamfered as shown in FIG. 4. More specifically, the six side faces of the polygon mirror 4 is grouped into five first faces 4a, 4b, 4c, 4d, 4e and one second face 4f. Angles of the first faces 4a-4e with respect to a bottom surface of the truncated six-sided pyramid are set so that the laser reflected by each one of the first faces 4a-4e reaches a first predetermined area. An angle of the second face 4f with respect to the bottom surface of the truncated six-sized pyramid is set so that the laser reflected by the second face 4f reaches a second predetermined area higher than the first predetermined area.

More specifically, if the angle of an arbitral face 4a of the polygon mirror 4 with respect to the bottom surface of the truncated six-sided pyramid is θ1' degree, the angle of the face 4b next to the face 4a is set at θ1'-Δ1' degree, and the angle of the face 4c next to the face 4b is set at θ1'-2Δ1' degree. Thus, the angles of the contiguous five first faces 4a-4e with respect to the bottom surface of the truncated six-sided pyramid are set at θ1' degree, θ1'-Δ1' degree, θ1'-2Δ1' degree, θ1-'-3Δ1' degree, and θ1'-4Δ1' degree. The angle of the second face 4f with respect to the bottom surface is set at φ1 degree, which is larger than θ1' degree.

Figure 5A:
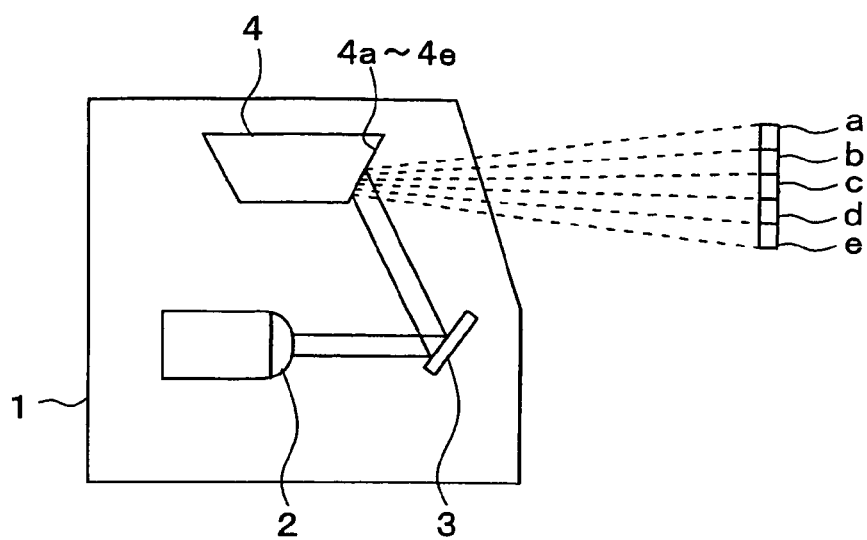
FIG. 5A is a schematic sectional diagram showing the object detector according to the first embodiment at a time when first faces of the polygon mirror reflect a laser.
Figure 5B:
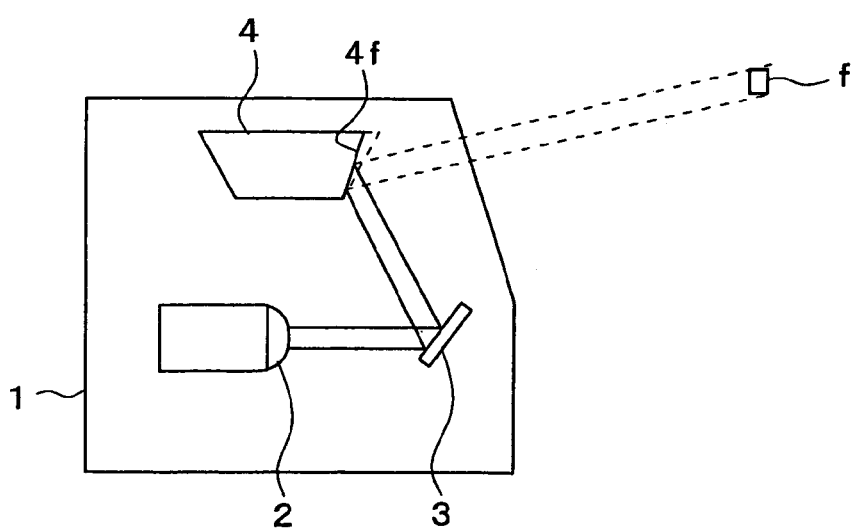
FIG. 5B is a schematic sectional diagram showing the object detector according to the first embodiment at a time when a second face of the polygon mirror reflects the laser.

Therefore, when the polygon mirror 4 reflects the laser, the reflected laser is projected ahead of the vehicle through the projection window 1c. When the laser is reflected by one of the first faces 4a-4e, the laser is projected at normal height as shown in FIG. 5A. Signs a, b, c, d, e in FIG. 5A schematically indicate the projection ranges of the lasers reflected by the first faces 4a-4e respectively. When the laser is reflected by the second face 4f, the laser is projected toward a position higher than the normal height as shown in FIG. 5B. A sign f in FIG. 5B schematically indicates the projection range of the laser reflected by the second face 4f.

As shown in FIG. 5A, when the laser is reflected by one of the first faces 4a-4e of the polygon mirror 4, the laser is projected to the area at the normal height in front of the vehicle. In this case, the laser can reach a preceding vehicle traveling on a position relatively far from the own vehicle. As a result, the detection range extends from a short distance to a long distance.

When the laser is reflected by the second face 4f of the polygon mirror 4, the laser is projected toward a position higher than the normal height in front of the vehicle. In this case, the laser is projected to the preceding vehicle traveling on a position relatively close to the own vehicle. However, if the distance from the preceding vehicle increases, the laser becomes higher than the height of the vehicle. Thus, the detection range is limited within the short distance.

Therefore, the normal detection is performed by using the first faces 4a-4e, and the detection in the short distance is performed by using the second face 4f.

The light receiver 6 includes a Fresnel lens 6a and a light receiving element 6b, which is provided by a photo diode, for instance. The light receiver 6 collects the laser by using the Fresnel lens 6a. If the collected laser is projected to the light receiving element 6b, the light receiving element 6b generates an output current or an output voltage in accordance with intensity of the received laser. Thus, the light receiver 6 can detect the laser projected to an upper portion of the case 1. The output current or the output voltage of the light receiver 6 is inputted to the control portion of the circuit board 5.

The light receiver 6 is positioned beside the polygon mirror 4. More specifically, the light receiver 6 is deviated from the rotary shaft of the polygon mirror 4 along a direction perpendicular to the rotary shaft of the polygon mirror 4.

Next, operation of the object detector of the present embodiment will be explained.

If a switch of automatic cruise control (adaptive cruise control) disposed in a vehicle compartment is turned on, the object detector of the present embodiment performs the detection of the objects in front of the vehicle.

First, the motor is driven based on the drive signal outputted from the control portion. Thus, the reflection mirror 3 is adjusted to a predetermined angle. Then, the light emitter 2 emits the laser at predetermined timing. The laser is reflected by the reflection mirror 3 and the polygon mirror 4 and projected ahead of the vehicle through the projection window 1c. If the laser is reflected by the preceding vehicle and the like in front of the own vehicle, the reflected light is collected by the Fresnel lens 6a through the entrance window 1d and projected to the light receiving element 6b.

The light receiving element 6b generates the output current or the output voltage corresponding to the intensity of the received laser. The control portion detects the output current or the output voltage. Thus, the control portion detects the object in front of the vehicle based on the output current or the output voltage. In addition, the control portion may measure a distance D from the preceding vehicle based on a time difference between the timing when the laser is emitted and the timing when the laser is detected, or an input-output time difference ΔT, and a velocity c of the laser based on a following formula (1).

$$D = c \times \Delta T / 2, \quad (1)$$

Since the polygon mirror 4 is rotated, the laser is projected to the first faces 4a-4e and the second face 4f of the polygon mirror 4 respectively. Thus, the laser can be projected to the area at the normal height and the area higher than the normal height. Thus, the area at the normal height and the area higher than the normal height can be scanned.

In the present embodiment, the angles of the first faces 4a-4e and the second face 4f are differentiated. It is known in advance which side face is the second face 4f among the side faces of the polygon mirror 4. The timing when the object detection or the distance measurement is performed by using one of the first faces 4a-4e is distinguished from the timing when the object detection or the distance measurement is performed by using the second face 4f. Thus, the object detection or the distance measurement can be performed while determining whether the preceding vehicle, of which the object detection or the distance measurement is performed, is the vehicle having the normal height or the vehicle having the large vehicle height.

If the distance between the preceding vehicle and the own vehicle is measured, outputs corresponding to the result of the measurement are outputted to exterior parts outside the case 1 such as an engine ECU (electronic control unit) or a brake ECU. Thus, an engine output or a braking force is controlled to maintain the distance between the preceding vehicle and the own vehicle at a predetermined distance.

As explained above, the object detector of the present embodiment has the polygon mirror 4 formed in the shape having the first faces 4a-4e for projecting the laser to the first predetermined area and the second face 4f for projecting the laser to the second predetermined area.

Therefore, by rotating the polygon mirror 4, the laser can be projected to the first predetermined area and the second predetermined area through the projection window 1c. More specifically, the object detector of the present embodiment can project the laser to the area at the normal height in front of the vehicle and also to the area higher than the normal height in front of the vehicle. Thus, even if the reflection object of the obstacle is positioned at a high position, for instance, in the case of a vehicle having large vehicle height, the laser can be projected to the reflection object. As a result, the object detection or the distance measurement can be performed correctly.

Second Embodiment

Next, an object detector according to a second embodiment of the present invention will be explained based on FIG. 6.

Figure 6:
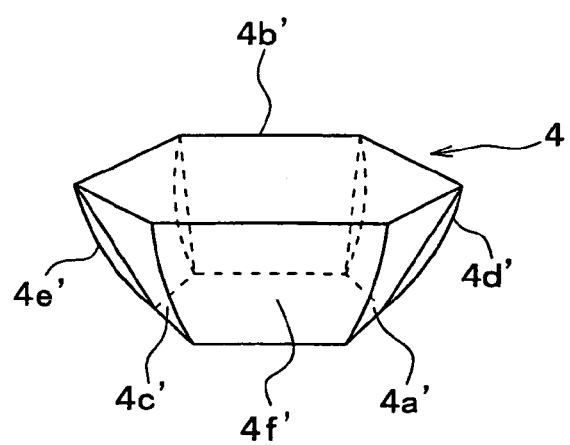
FIG. 6 is a polygon mirror of an object detector according to a second embodiment of the present invention.

As shown in FIG. 6, a polygon mirror 4 of the object detector of the second embodiment is formed in the shape of a truncated six-sided pyramid. Six side faces of the truncated six-sided pyramid is grouped into three first faces 4a', 4b', 4c' and three second faces 4d', 4e', 4f'. The first faces 4a'-4c' are formed in the shape of flat surfaces. The second faces 4d'-4f' are formed in the shape of convex surfaces.

If an angle of an arbitral face 4a' of the polygon mirror 4 with respect to a bottom surface (an upper surface in FIG. 6) of the truncated six-sided pyramid is θ2 degree, an angle of the face 4d' next to the face 4a' is set at θ2' degree, and an angle of the face 4b' next to the face 4d' is set at θ2-Δ2 degree. An angle of the face 4e' next to the face 4b' is set at θ2'-Δ2' degree. Thus, the angles of the contiguous six faces 4a', 4d', 4b', 4e', 4c', 4f' are set at θ2 degree, θ2' degree, θ2-Δ2 degree, θ2'-Δ2' degree, θ2-2Δ2 degree, and θ2'-2Δ2' degree in that order, on the basis of one arbitral face.

Figure 7A:
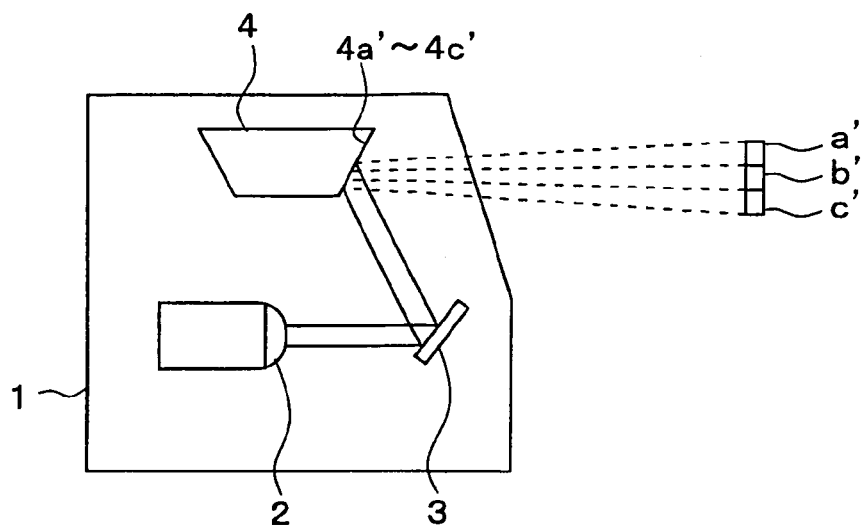
FIG. 7A is a schematic sectional diagram showing the object detector according to the second embodiment at a time when first faces of the polygon mirror reflect the laser.
Figure 7B:
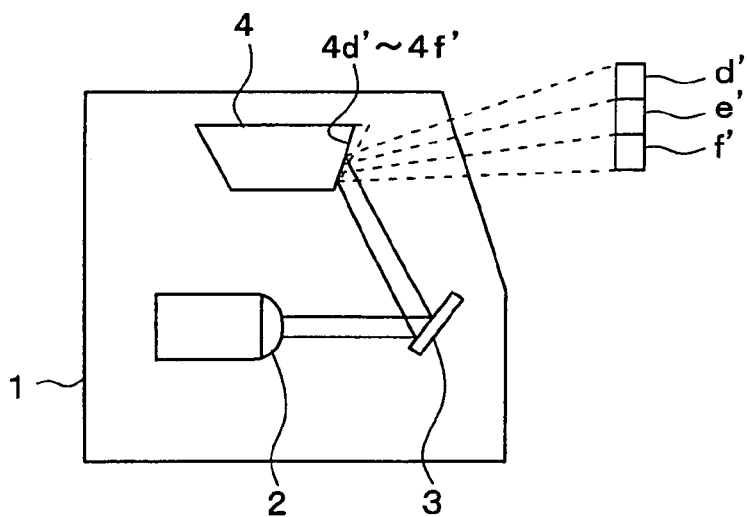
FIG. 7B is a schematic sectional diagram showing the object detector according to the second embodiment at a time when second faces of the polygon mirror reflect the laser.

If the laser is projected to the first faces 4a'-4c', the range of the reflected laser coincides with a first predetermined range (for instance, a range of approximately 4 degrees) in the vertical direction as shown in FIG. 7A. In FIG. 7A, signs a', b', c' schematically indicate the ranges to which the laser reflected by the first faces 4a'-4c' reaches. If the laser is projected to the second faces 4d'-4f', the range of the laser is enlarged by the convex surfaces. Therefore, in this case, the range of the reflected laser in the vertical direction coincides with a second predetermined range wider than the first predetermined range, or a range wider than 4 degrees, as shown in FIG. 7B. In FIG. 7B, signs d', e', f' schematically indicate the ranges to which the laser reflected by the second faces 4d'-4f' reaches.

When the laser is projected with the use of the second faces 4d'-4f', the laser can be projected to the area including the area at the normal height in front of the vehicle and the position higher than the normal height. Therefore, the normal object detection or the normal distance measurement in the long distance is performed with the use of the first faces 4a'-4c' of the polygon mirror 4. The object detection or the distance measurement in the short distance is performed with the use of the second faces 4d'-4f' of the polygon mirror 4.

The second predetermined area scanned by reflecting the laser with the use of the second faces 4d'-4f' is set larger than the first predetermined area scanned by reflecting the laser with the use of the first faces 4a'-4c'. By setting the second predetermined area to include the position higher than the normal height, an effect similar to the effect of the first embodiment can be achieved.

(Modifications)

In the first and second embodiments, the laser as a kind of light waves is used as the probe light. Alternatively, any kinds of light waves may be used instead of the laser.

In the first and second embodiments, the side faces of the polygon mirror 4 are directed downward. Alternatively, the side faces may be directed upward. If the polygon mirror 4 of the first embodiment is used in a state in which the first and second faces 4a-4f are directed upward, the angle of the second face 4f with respect to the bottom surface should be set smaller than the angles of the first faces 4a-4e. More specifically, the second face 4f should be turned up more than the first faces 4a-4e.

If the polygon mirror 4 of the second embodiment is used in a state in which the first and second faces 4a'-4f' are directed upward, the polygon mirror 4 should be formed so that the range of the laser reflected by the second faces 4d'-4f' includes a position higher than the normal height.

In the first and second embodiments, the polygon mirror 4 in the shape of the truncated six-sided pyramid is employed as the rotary body. The shape of the rotary body is not limited to the truncated six-sided pyramid. Any other shape of the rotary body can be employed if the rotary body has the first faces 4a-4e or the first faces 4a'-4c', which are used in the normal object detection or the normal distance measurement, and the second face 4f or the second faces 4d'-4f', which can reflect the laser to the position higher than the normal height and are used in the object detection or the distance measurement in the short distance. For instance, the rotary body may be provided by any other multi-sided pyramid than the truncated six-sided pyramid.

The numbers of the first faces 4a-4e and the second face 4f of the polygon mirror 4 of the first embodiment are not limited to the numbers of the first embodiment. The numbers of the first faces 4a-4e and the second face 4f of the polygon mirror 4 of the first embodiment may be set arbitrarily if at least one first face and at least one second face are provided.

The numbers of the first faces 4a'-4c' and the second faces 4d'-4f' of the polygon mirror 4 of the second embodiment are not limited to the numbers of the second embodiment. The numbers of the first faces 4a'-4c' and the second faces 4d'-4f' of the polygon mirror 4 of the second embodiment may be set arbitrarily if at least one first face and at least one second face are provided.

The present invention should not be limited to the disclosed embodiments, but may be implemented in many other ways without departing from the spirit of the invention.

What is claimed is:

1. An object detector including a case, a light emitter disposed in the case for emitting probe light, a rotary body disposed in the case for reflecting the probe light at reflection faces thereof to scan a predetermined area with the probe light, a projection window formed by a translucent material for allowing passage of the probe light reflected by the rotary body, and a light receiver disposed in the case for receiving reflected light of the probe light, the object detector detecting an object by reflecting the probe light, which is emitted by the light emitter, at the rotary body, by projecting the probe light to an outside of the case through the projection window, and by receiving the probe light reflected by an object outside the case with the light receiver, wherein
   the reflection faces of the rotary body include a first face for projecting the probe light to a first predetermined area through the projection window and a second face for projecting the probe light to a second predetermined area higher than the first predetermined area through the projection window, and
   the rotary body rotates to project the probe light to the first predetermined area and the second predetermined area through the projection window, wherein
   the object detector is mounted in a vehicle,
   the second predetermined area is located a vertical distance above the first predetermined area relative to the vehicle, and
   a projection angle of the second face is different than a projection angle of the first face.

2. The object detector as in claim 1, wherein
   the object detector measures a distance from the object reflecting the probe light based on the probe light received by the light receiver.

3. The object detector as in claim 1, wherein
   the reflection faces of the rotary body are formed in the shape of side faces of a multi-sided pyramid, and
   the rotary body is formed so that the first face is provided by one of the side faces of the multi-sided pyramid and the second face is provided by another one of the side faces of the multi-sided pyramid.

4. The object detector as in claim 1, wherein
   the rotary body is provided by a polygon mirror having reflection faces in the shape of side faces of a truncated six-sided pyramid, and
   the rotary body is formed so that the second face is provided by at least one of the side faces of the polygon mirror and the first face is provided by the other side faces of the polygon mirror.

5. An object detector including a case, a light emitter disposed in the case for emitting probe light, a rotary body disposed in the case for reflecting the probe light at reflection faces thereof to scan a predetermined area with the probe light, a projection window formed by a translucent material for allowing passage of the probe light reflected by the rotary body, and a light receiver disposed in the case for receiving reflected light of the probe light, the object detector detecting an object by reflecting the probe light, which is emitted by the light emitter, at the rotary body, by projecting the probe light to an outside of the case through the projection window, and by receiving the probe light reflected by an object outside the case with the light receiver, wherein the reflection faces of the rotary body include a first face for projecting the probe light to a first predetermined area through the projection window so that vertical length of the first predetermined area becomes a predetermined range and a second face for projecting the probe light to a second predetermined area, which is larger than the first predetermined area and includes an area higher than the first predetermined area, and the rotary body rotates to project the probe light to the first predetermined area and the second predetermined area through the projection window, wherein the object detector is mounted in a vehicle, the second predetermined area includes an area a vertical distance above the first predetermined area relative to the vehicle, and a projection angle of the second face is different than a projection angle of the first face.

6. The object detector as in claim 5, wherein
the object detector measures a distance from the object reflecting the probe light based on the probe light received by the light receiver.

7. The object detector as in claim 5, wherein
the reflection faces of the rotary body are formed in the shape of side faces of a multi-sided pyramid, and
the rotary body is formed so that the first face is provided by one of the side faces of the multi-sided pyramid and the second face is provided by another one of the side faces of the multi-sided pyramid.

8. The object detector as in claim 5, wherein
the second face is formed in the shape of a convex surface.

9. The object detector as in claim 5, wherein
the rotary body is provided by a polygon mirror having reflection faces in the shape of side faces of a truncated six-sided pyramid, and
the rotary body is formed so that the second face is provided by at least one of the side faces of the polygon mirror and the first face is provided by the other side faces of the polygon mirror.

10. The object detector as in claim 1, wherein none of the reflection faces project the probe light to a third predetermined area located at the vertical distance between the first predetermined area and the second predetermined area.

11. The object detector as in claim 5, wherein the second predetermined area includes the first predetermined area and the area higher than the first predetermined area, and a predetermined range of a vertical length of the second predetermined area is greater than and includes the predetermined range of the vertical length of the first predetermined area.

* * * * *